United States Patent Office 3,729,458
Patented Apr. 24, 1973

3,729,458
COUPLING TETRAZOTIZED AROMATIC DI-
AMINES WITH AMINO HYDROXYNAPH-
THALENES EMPLOYING BASIC INORGANIC
SALTS OF MAGNESIUM OR LITHIUM
Gustav Edward Rast, Hamburg, N.Y., assignor to Allied
Chemical Corporation, New York, N.Y.
No Drawing. Filed Apr. 1, 1969, Ser. No. 812,391
Int. Cl. C09b 35/02, 35/10, 35/24
U.S. Cl. 260—182                 11 Claims

ABSTRACT OF THE DISCLOSURE

An improvement in the process of coupling tetrazotized aromatic diamines with aminohydroxynaphthalenes is provided by employing an acid binding agent selected from basic inorganic compounds of lithium and magnesium.

The present invention relates to an improvement in coupling diazonium salts with aromatic nuclei. More particularly it relates to coupling tetrazotized diamines of the diphenyl series with aninohydroxynaphthalenes. It is especially concerned with coupling of such diazonium salts at a pH of about 1 to 3 with aminohydroxynaphthalene sulfonic acids or salts thereof wherein the amino and hydroxy radicals are attached to different rings of the naphthalene nucleus ortho to a hydrogen substituent.

The manufacture of many valuable water soluble polyazo dyestuffs such as C.I. Direct Black 38 involves coupling of a tetrazotized diamine ortho to the amino substituent of H-Acid (8-amino-1-naphthol - 3,6 - disulfonic acid) and similar compounds to form a diazonium compound which is in turn reacted with a coupling agent. The ortho-amino coupling is effected in acid medium, i.e. at a pH of 3 or less, to repress coupling ortho to the hydroxy substituent. This side reaction produces a monoazo product which is incapable of further coupling of the naphthalene nucleus and which gives rise to impurities in the polyazo dyestuff (see H. Zollinger "Azo and Diazo Chemistry" Interscience 1961, pp. 263–265). Thus, while the desired orientation of coupling requires the aforementioned acid reaction conditions, the coupling rate diminishes with increasing reaction mass acidity. As a result, the coupling reaction is impractically slow, requiring about 42 hours or longer for completion. Heating the coupling mass to speed the reaction promotes the orthohydroxy coupling side-reaction and hence is undesirable. To overcome the foregoing disadvantage, it has been proposed to to buffer the coupling mass in the pH range of about 1 to 3 by addition of acid binding agents such as sodium bicarbonate, calcium carbonate or sodium acetate. These expedients however are relatively ineffective in accelerating the desired coupling reaction and often exert little benefit over the unbuffered reaction mass. Moreover, the use of sodium acetate promotes formation of the undesired ortho-hydroxy coupling component. (See H. E. Fierz-David and L. Blangey "Fundamental Processes of Dye Chemistry," Interscience, 1949, pp. 291–293.)

It is an object of the present invention to provide an improved process for coupling of a tetrazotized aromatic diamine with an amino hydroxynaphthalene sulfonic acid or salt thereof wherein the amino and hydroxy radicals are attached to different rings of the naphthalene nucleus ortho to a hydrogen substituent.

This and other objects and advantages will be apparent from the following description of my invention.

In accordance with the present invention, the disadvantages of the foregoing prior art procedures are overcome and coupling is rapidly accelerated without promotion of the undesired ortho-hydroxy coupling side-reactions by a process which comprises combining a tetrazotized aromatic diamine with an aminohydroxynaphthalene sulfonic acid or salt thereof in the presence of an acid binding agent selected from basic inorganic compounds of lithium and magnesium having a water solubility of less than about 2 weight percent to maintain a pH in the range of about 1 to 3.

It has been discovered that coupling according to the present invention is about 2 to 10 times more rapid than prior art procedures in which coupling was conducted either in the absence of acid binding agent or in the presence of such bases as sodium bicarbonate, calcium carbonate, etc. The polyazo dyestuffs prepared from the instant coupled components are equal to or superior in brilliance and attractiveness of shade to the same dyestuff prepared from the same components but coupled by prior art procedures.

The coupling components employed in the present invention are well known in the art and are combined according to conventional techniques. Thus, the aqueous acidic tetrazotized aromatic diamine is combined with the amino hydroxy naphthalene sulfonic acid in known manner. The basic acid-binding agent of the invention is added, preferably at intermittent stages during the reaction to adjust and to maintain the pH within the range of about 1 to 3 and, preferably at about 1.7 to 1.9. Desirably the coupling mass is agitated vigorously to maintain any unreacted basic additive in suspension.

The coupling product can then be converted to polyazo dyestuffs in conventional fashion, for example, by alkaline coupling with a diazo compound, for example a diazotized arylamine, and thereafter combining the resultant disazodiazonium salt with a suitable coupling component, for example an aromatic amine such as a 1,2- or 1,4-diamine or amino-hydroxy compound of the benzene series, to produce a trisazo dyestuff.

While the amount of lithium or magnesium basic additive required for coupling in accordance with the invention will vary somewhat depending on the acidity of the initial mixture of tetrazotized diamine and coupling component, generally, at least about one equivalent of the acid binding agent per molar proportion of coupling component is effective. Preferably, an excess corresponding to about 1.2 to about 6 equivalents of said acid-binding agent per mole of coupling component is employed.

The agent employed in the present process is any oxide, carbonate or other basic inorganic salt of magnesium or lithium having a water solubility of less than about 2 weight percent at ambient temperature (25° C.). The term basic as employed herein is meant to designate a compound of acids and bases in which not all of the hydroxide of the base has been replaced by an acid radical; e.g. bases that are not completely neutralized.

While the exact mechanism by which the instant binding agents serve to accelerate the coupling reaction is not known, it is believed that the solubility of the particular binding agent has an important effect on the coupling rate. Certain more soluble compounds, for example lithium hydroxide having a solubility of about 12.9 weight percent at ambient temperature, are unsatisfactory in the instant process. The accelerating effect, however, cannot be totally attributed to insolubility since other highly insoluble compounds such as calcium carbonate have hardly any effect on the coupling rate as illustrated further hereinbelow.

Typical acid binding agents within the scope of this invention include the following representative examples:

magnesium oxide
magnesium hydroxide
magnesium carbonate (magnesite)
magnesium basic carbonate (hydromagnesite)
magnesium carbonate pentahydrate (lansfordite)

magnesium carbonate trihydrate (nesquehonite)
lithium carbonate
lithium phosphate (tribasic)
lithium meta borate Lithium carbonate and magnesium oxide are preferred agents of the invention.

The tetrazotized aromatic diamines employed in the present coupling process are completely tetrazotized and include the water-soluble salts thereof, for example the chlorides, sulfates, etc. They are prepared in known manner, for example, by reacting the aromatic diamine at diazotization temperatures in acid solution with sodium nitrite. The tetrazotized diamines may also contain substituents on the aromatic nucleus such as lower alkyl of 1 to 5 carbon atoms, lower alkoxy of 1 to 5 carbon atoms, halogen such as Cl, Br, sulfonic acid groups and any other substituents well known in this art provided such substituents are inert to the coupling reaction. Carboxylic acid substituents for example, may promote ortho hydroxy coupling and hence are undesirable.

Typical tetrazotized aromatic diamines which can be employed as coupling components in the present process include the following compounds as well as the water soluble salts thereof:

benzidine
dianisidine
ortho- or meta tolidine
paraphenylenediamine
4,4'-diaminostilbene-disulfonic acid
4,4'-diaminostilbene
2,2'-dichlorobenzidine
2,2'-dibromobenzidine
2,2'-dichloro-5,5-dimethoxybenzidine
3,3'-dimethoxybenzidine
2,2'-dinitrobenzidine
4,4'-diamino-2,2'-biphenyl disulfonic acid
4,4'-diamino-3-biphenylsulfonic acid
4,4'-diamino-3,3'-biphenyldisulfonic acid
4,4'-diamino-3,3'-dimethylbiphenyl
4,4'-diamino-2,2'-dimethylbiphenyl
4,4'-diamino-3-ethoxybiphenyl Tetrazotized benzidine is the preferred diazonium component of the invention.

The coupling components of the present process are monoamino-monohydroxynaphthalene sulfonic acids, alkali metal such as sodium, lithium, potassium, etc. or ammonium salts thereof wherein the hydroxy and amino substituents are attached to different rings of the naphthalene nucleus ortho to a hydrogen substituent. If desired, the naphthalene nucleus of the coupling component can be further substituted with conventional radicals (desirably other than carboxylic acid groups for the reason noted above) such as lower alkyl, lower alkoxy, halogen and the like. Typical examples of coupling components suitable for use in the present process include the following:

6-amino-1-hydroxynaphthalene 3-sulfonic acid
8-amino-1-hydroxynaphthalene 3,6-disulfonic acid
8-amino-1-hydroxynaphthalene 3,4,4-trisulfonic acid
8-amino-1-hydroxynaphthalene 3,4,5,6-tetrasulfonic acid
7-amino-1-hydroxynaphthalene 3-sulfonic acid
5-amino-1-hydroxynaphthalene 3-sulfonic acid
7-amino-1-hydroxynaphthalene 3,6-disulfonic acid
8-amino-1-hydroxynaphthalene 3,5-disulfonic acid
6-amino-5-chloro-2-hydroxynaphthalene 3-sulfonic acid
8-amino-1-hydroxynaphthalene 5-sulfonic acid and alkali metal or ammonium salts of any of these components.

Preferred coupling components of the invention are 6-amino-1-hydroxynaphthalene 3-sulfonic acid, and especially, 8-amino-1-hydroxynaphthalene 3,6-disulfonic acid and salts thereof. When a lithium basic additive is employed in the present process, a particularly good result is obtained by charging therewith an aqueous solution of a lithium salt of the coupling component.

The novel improvement of the invention is applicable to acid coupling of tetrazotized aromatic diamines and aminohydroxy naphthalene sulfonic acid coupling components which may be used in preparing a large number of water soluble polyazo dyes by methods known in the art such as C.I. Direct Brown 165, C.I. direct dye, Part II ref. 22230; dyestuffs of Germans Pats. 216,636 and 469,946; U.S. Pats. 688,478; 1,590,042; 1,610,946; 1,789,888; 1,841,828; 1,885,609; 1,888,757; 1,903,021; 2,012,387; 2,073,000; 2,083,019; 2,103,778; 2,183,087; 2,202,350; 2,248,074; 2,671,776; 2,833,756; 2,885,390 and 2,885,391. It is especially suited to the manufacture of trisazo direct dyes for cellulosic fiber of the type disclosed in aforementioned U.S. Pat. 688,478, notably Colour Index Direct Blacks 4 and 38.

In the following examples which serve to illustrate my invention parts, percentages, and proportions are by weight unless otherwise noted and temperatures are in degrees Centigrade.

EXAMPLE 1

(A) Preparation of tetrazobenzidine

A 314.5 part by volume aqueous slurry of benzidine sulfate (corresponding to 36.8 parts, 0.2 mole benzidine) is acidified with 81.2 parts of 20° Be' aqueous hydrochloric acid and cooled to about 7° to 8°. Over a 45 minute period, 28.8 parts (0.418 mole) of anhydrous sodium nitrite is added to the diazotization mixture which is agitated for about one hour after completion of the addition. After addition of about 0.5 to 1 part sulfamic acid, the resultant solution is agitated at 9° for 10 minutes to destroy excess nitrous acid.

(B) Coupling of Tetrazobenzidine and 8-amino-1-hydroxy-naphthalene 3,6-disulfonic acid Over a period of about 15 minutes, about 76 parts of moist 8-amino-1-hydroxy-naphthalene 3,6-disulfonic acid, monosodium salt (containing about 68.2 parts, 0.2 mole of the pure salt) is charged to the above tetrazotized benzidine solution with vigorous agitation. The pH of the resultant mixture is adjusted from 1.1 (at 10°) to about 1.7–1.75 over a period of 45 minutes by addition of pulverulent lithium carbonate while the mixture is allowed to warm to about 24–25°. The coupling mass is then agitated for about 4½ hours at 24–25°, lithium carbonate being charged intermittently to maintain the pH at the latter value. Coupling is substantially complete after 6.5 hours (measured from commencement of coupling component addition) as is indicated by a substantially negative test for tetrazo benzidine (determined by contacting a sample of the coupling mass with aqueous alkaline 2-hydroxynaphthalene-3,6-disulfonic acid, disodium salt following the procedure of K. Venkataraman, "The Chemistry of Synthetic Dyes." Academic Press Inc., 1952, vol. I, u. 222). The total lithium carbonate consumed in the coupling procedure is 21 parts (0.274 mole; 0.548 equivalents).

(C) Preparation of C.I. Direct Black 38 from Coupling Mass

The resultant aqueous mass containing the product azodiazo compounds tetrazotized benzidine coupled into the 7 position of the aminohydroxynaphthalene sulfonic acid coupling component, is converted to Color Index Direct Black 38 by the following conventional procedure.

The coupled mass containing the azodiazo compound, is cooled to about 5° to 10° and acidified with 58.1 parts 20° Be' aqueous hydrochloric acid. After addition of 19.2 parts (0.207 mole) aniline and 14.4 parts (0.209 mole) anhydrous sodium nitrite, the cold mixture is agitated for 20 minutes to diazotize the aniline to phenyldiazonium chloride. Sulfamic acid is charged to destroy excess nitrous acid. Over a period of about 5 to 10 minutes, 25 parts of lithium hydroxide is charged to make the reaction mass which contains the aforementioned azodiazo compound and the aromatic diazo compound, phenyldiazoniumchloride, alkaline to Brilliant Yellow indicator. The alkaline coupling mass is agitated for 30 to 45 minutes at 10–15° to which contains the aforementioned azodiazo compound and the aromatic diazo compound, phenyldiazoniumchloride, alkaline to Brilliant Yellow indicator. The alkaline coupling mass is agitated for 30 to 45 minutes at 10–15° to couple the aforementioned aromatic diazo compound into the aforementioned azodiazo product ortho to the hydroxy substituent on the naphthalene nucleus of the latter product thereby forming a disazodiazonium salt product. A 41.6 part aqueous solution containing 21.6 parts (0.2 mole) of m-phenylene diamine coupling compound is charged to the mixture containing the aforementioned diazodiazonium salt product which is agitated for about 20 minutes to couple the aforementioned diazodiazonium salt into the aforementioned coupling component. The resultant product (1063 parts) is an aqueous solution containing about 25% of a lithium salt of polyazo dyestuff Colour Index Direct Black 38.

By visual comparison of paper dyeings, this product is rated equal to superior in attractiveness of shade and brilliance to a 25% aqueous solution of Colour Index Direct Black 38 prepared in conventional fashion, i.e. without addition of an acid binding agent as in Example 6 below. This result indicates that the novel process, in addition to expediting the initial coupling, does not promote formation of impurities which lead to off-shade dyeings.

EXAMPLES 2–6

Examples 2–6 (the results of which are compared to those of Example 1 in the table below) are preparations of Colour Index Direct Black 38 dyestuffs employing a tetrazotized benzidine-aminohydroxynaphthalene sulfonic acid salt coupling procedure which is substantially the same as that of Example 1 except for the acid binding agent charged. In Example 5, however, 30.8 parts of 59.8% benzidine hydrochloride corresponding to 18.4 parts, 0.1 mole benzidine is charged in place of the benzidine sulfate of Example 1 to avoid possible precipitation of calcium sulfate together with 40 parts of the coupling component containing 36.9 parts; 0.105 mole 8-amino-1-hydroxynaphthalene-3,6-disulfonic acid, monosodium salt. Example 2 illustrates use of a basic inorganic magnesium compound such as magnesium oxide as acid binding agent according to the invention; Examples 3–5 are comparative examples illustrating the relatively slow coupling resulting from use of prior art acid binding agents; and Example 6 illustrates the excessively slow coupling obtained when the acid-binding agent is omitted.

TABLE

| Ex. | Acid binding agent | Coupling pH which is maintained by addition of the acid binding agent | Time required for completion of the coupling of tetrazotized amine and coupling component, hours |
|---|---|---|---|
| 1 | 21 parts lithium carbonate | 1.7–1.75 | 6.5 |
| 2 | 18 parts magnesium oxide | As in Ex. 1 | 4 |
| 3 | 67.7 parts sodium carbonate (charged as 35% aqueous solution). | 1.7–1.8 | 26.5 |
| 4 | 28.5 parts sodium bicarbonate | 1.7–2.0 | 20 |
| 5 | 16 parts calcium carbonate | 1.6–1.8 | 41.5 |
| 6 | None | <3 | 42.5 |

I claim:
1. In the aqueous acidic coupling of a tetrazotized aromatic diamine ortho to the amino-substituent of an aminohydroxy naphthalene sulfonic acid or alkali metal salt thereof wherein the amino- and hydroxy-substituents are attached to different rings of the naphthalene nucleus ortho to a hydrogen-substituent,
the improvement which consists in conducting the coupling reaction at a pH in the range of about 1 to 3 in the presence of an acid-binding agent selected from the group consisting of inorganic basic compounds of lithium and magnesium having a water solubility of less than about 2 weight percent at 25° C.
2. A process as claimed in claim 1 wherein said acid-binding agent is a lithium compound selected from the group consisting of lithium carbonate, lithium phosphate and lithium metaborate.
3. A process as claimed in claim 1 wherein said acid-binding agent is a magnesium compound selected from the group consisting of magnesium oxide, magnesium hydroxide and magnesium carbonate.
4. A process as claimed in claim 1 wherein said tetrazotized aromatic diamine is tetrazotized benzidine and said aminohydroxynaphthalene sulfonic acid is 6-amino-1-hydroxynaphthalene-3-sulfonic acid.
5. A process as claimed in claim 1 wherein said tetrazotized aromatic diamine is tetrazotized benzidine and said aminohydroxynaphthalene sulfonic acid is 8-amino-1-hydroxynaphthalene 3,6-disulfonic acid.
6. A process as claimed in claim 4 wherein said acid-binding agent is lithium carbonate.
7. A process as claimed in claim 4 wherein said acid-binding agent is magnesium oxide.
8. A process as claimed in claim 5 wherein said acid-binding agent is lithium carbonate.
9. A process as claimed in claim 5 wherein said acid-binding agent is magnesium oxide.
10. A process as claimed in claim 1 wherein said pH is maintained within the range of about 1.7 to about 1.9.
11. In the process for the preparation of polyazo dyestuffs comprising (A) coupling a tetrazotized aromatic diamine in aqueous acidic medium ortho to the amine substituent of an aminohydroxynaphthalene sulfonic acid wherein the amino- and hydroxy-substituents are attached to different rings of the naphthalene nucleus ortho to a hydrogen substituent, to form an azodiazo compound, (B) coupling the resultant azo-diazo compound in alkaline medium with an aromatic diazo compound to form a disazodiazonium salt and (C) coupling the resultant disazodiazonium salt with a coupling component to prepare a polyazo dyestuff; the improvement which consists in conducting (A) at a pH in the range of about 1 to 3 in the presence of an acid-binding agent selected from the group consisting of inorganic basic compounds of lithium or magnesium, said acid-binding agent having a water solubility of less than about 2 weight percent at 25° C.

References Cited
UNITED STATES PATENTS 2,813,852  11/1957  Grandsean et al. ____ 260—144
2,885,391  5/1959  Huss et al. _____ 260—144

FLOYD DALE HIGEL, Primary Examiner

U.S. Cl. X.R.

260—141, 144, 178, 180, 181, 183